United States Patent [19]
Emery

[11] Patent Number: 5,386,850
[45] Date of Patent: Feb. 7, 1995

[54] ROTATABLE DOUBLE-ENDED QUICK CONNECT VALVE AND METHOD OF OPERATION

[76] Inventor: Roy W. Emery, 1 Donino Court, Toronto, Ontario, Canada, M4N 2H6

[21] Appl. No.: 247,086
[22] Filed: May 20, 1994
[51] Int. Cl.$^6$ ............................................. F16L 37/28
[52] U.S. Cl. ................................. 137/614.04; 137/580; 251/149.3
[58] Field of Search ............................ 137/614.04, 580; 251/149.7, 149.3

[56] References Cited

U.S. PATENT DOCUMENTS

| | | | |
|---|---|---|---|
| 3,894,558 | 7/1975 | Pederson | 137/580 |
| 3,918,486 | 11/1975 | Cyphelly | 137/580 |
| 4,664,145 | 5/1987 | Stich et al. | 137/580 |
| 4,852,611 | 8/1989 | Knerr et al. | 137/614.04 |
| 5,174,863 | 12/1992 | Emery | 162/396 |

Primary Examiner—A. Michael Chambers
Attorney, Agent, or Firm—Marshall, O'Toole, Gerstein, Murray & Borun

[57] ABSTRACT

A rotatable double-ended quick connect valve comprised of a single valve body for rotatably mounting on a shaft, and fitted with two separately located quick connect valve mechanisms for the continuous transfer of fluids (liquid or gaseous or a combination of both) between a pipe connection fixedly mounted on the same shaft, and a continuing series of mating single-ended quick connect valves fixedly mounted in separate locations along the travel path of said double-ended quick connect valve.

5 Claims, 6 Drawing Sheets 5,386,850

ROTATABLE DOUBLE-ENDED QUICK CONNECT VALVE AND METHOD OF OPERATION

FIELD OF THE INVENTION

This invention relates to quick connect valves operating at moderate pressure differences and required to make a continuing series of quick connection changes in rapid succession.

BRIEF DESCRIPTION OF THE PRIOR ART

Quick connect valves are well known and in common use, but in general they are intended for making only an occasional single connection, and such a valve is usually operated as one of two mating units, one or both of which may be required to have a spring-loaded valve action, depending on whether one unit or both units are required to maintain a closed valve action when the two units are not mated together. Quick connect valves available from stock are generally designed to serve a range of moderate to high pressure differences, and the two mating units are commonly held together in the mated position with a screwed connection.

BACKGROUND OF THE INVENTION

The requirement for a rotatable double-ended quick connect valve arose with the development of a new mould transfer mechanism described in U.S. Pat. No. 5,174,863 awarded to Emery in December of 1992. In the operation of this mould transfer system, vented dies containing wet moulded pulp preforms are mounted in groups on a series of rotatable shaft assemblies transferable from one rotor to another and transported on a series of transfer rotors between the forming rotor and the hot press drying rotor, and it is necessary to maintain a continuing vacuum supply to each die in order to hold the wet preforms in place as they travel about on the transfer rotors and are transferred from one rotor to another.

In the operation of the embodiment shown in the drawings, each of the transporting rotors has a multiplicity of support positions, each to receive, one at a time, and then released to another rotor, a continuing series of said rotatable and transferable shaft assemblies, each of said shaft assemblies being fitted with a rotatable double-ended quick connect valve serving the vented dies and each of said support positions being fitted with a single ended quick connect valve rigidly fixed in a position to mate with a quick connect valve function at one end of said rotatable double-ended quick connect valve mounted on said shall assembly. When said shaft assembly is being transferred from a support position on one of said rotors to a support position on the next following rotor, the two quick connect valve functions, one at each end of said double-ended quick connect valve, are then connected and mated simultaneously with each of the two related single ended quick connect valves, mounted one on each of the two support positions, one on each rotor, on which said shaft assembly is simultaneously supported at the instant of beginning the transfer from one of said rotors to the next following rotor.

Because the supply of vacuum to the vented dies on each shaft assembly is directed from a fixed valve position on the transporting rotor to a fixed pipe connection on the shaft assembly on which said vented dies are transported, and because in some arrangements and on some rotors it is necessary for said shaft assembly to rotate through an angle of rotation of 300 degrees or more on one of said rotors, it is prohibitively difficult to use a hose connection between the rotor source and the rotating die positions, and therefore, it is necessary to arrange for the double-ended quick connect valve to be rotatable on the shaft in relation to the pipe connection to said shaft assembly.

BRIEF DESCRIPTION OF THE DRAWINGS

In the drawings, which illustrate a preferred embodiment.

DETAILED DESCRIPTION OF A PREFERRED EMBODIMENT

Figure 1:
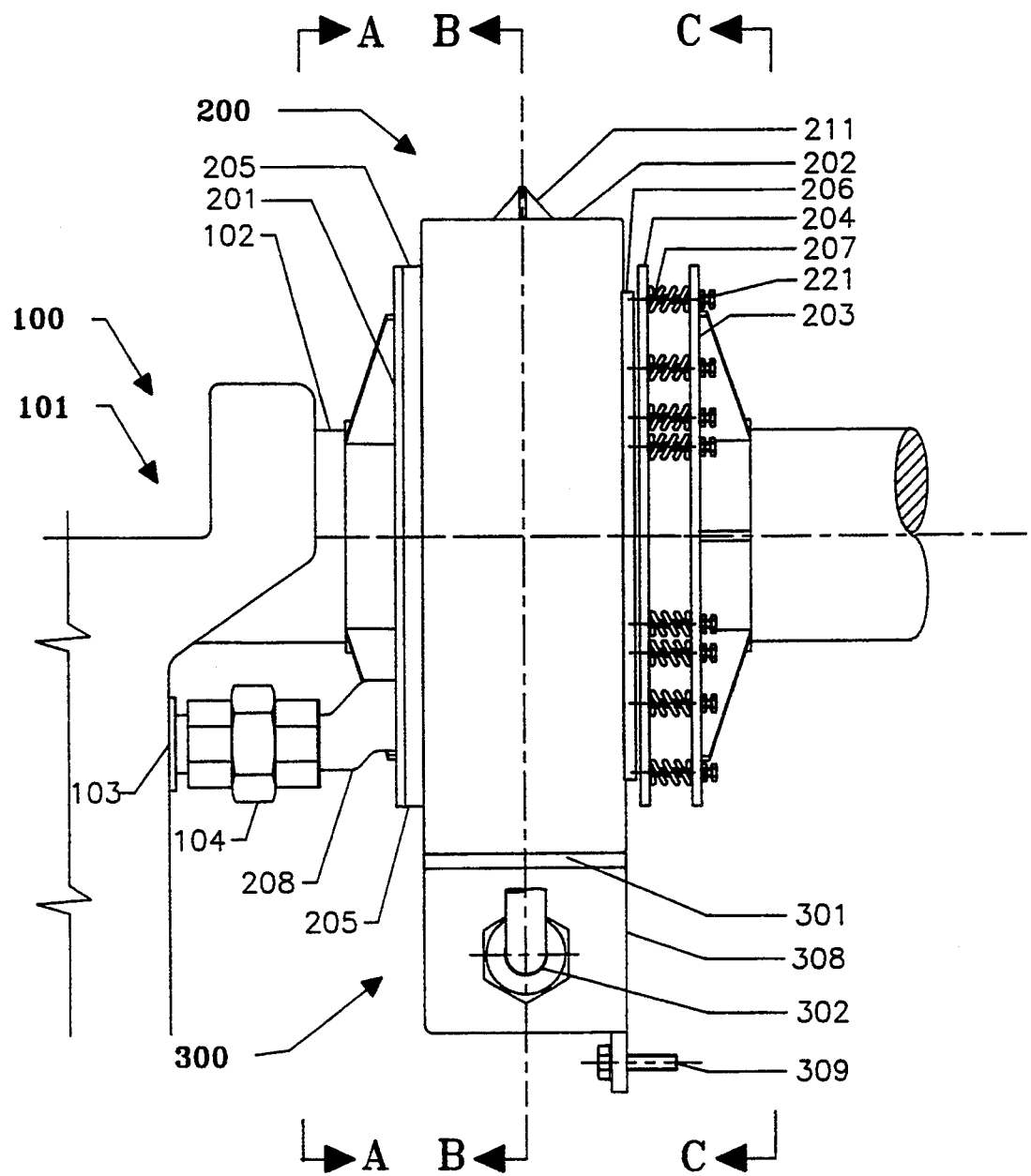
FIG. 1 is a side elevation of a rotatable double-ended quick connect valve and a portion of the die transfer assembly to which it is connected, the related shaft on which said valve is installed, and the mating single-ended quick connect valve in a fixed position on the transporting rotor.

In the drawings, FIG. 1 is an external side view of a rotatable double-ended quick connect valve 200 as installed on the shaft end 102 of a rotatable transferable shaft assembly 100, showing a small part of the space 101 for placing a group of vented transfer and press dies, and the pipe connection 103 and union 104 for connecting to the pipe connection 208 on the back plate 201 of said double-ended valve 200. Also shown is the valve body 202 with the contact bar 211 at one end, and with rubbing gasket 205 and ball bearing 206, and front plate 203 with springs 207, guide pins 221, and pressure plate 204. One fully connected mating single-ended quick connect valve 300 is also shown with compression gasket 301 and hose connection 302 to the source of vacuum or compressed air supply on the transporting rotor, and the fixing screws 309 for a firm connection to the transporting rotor.

Figure 2:
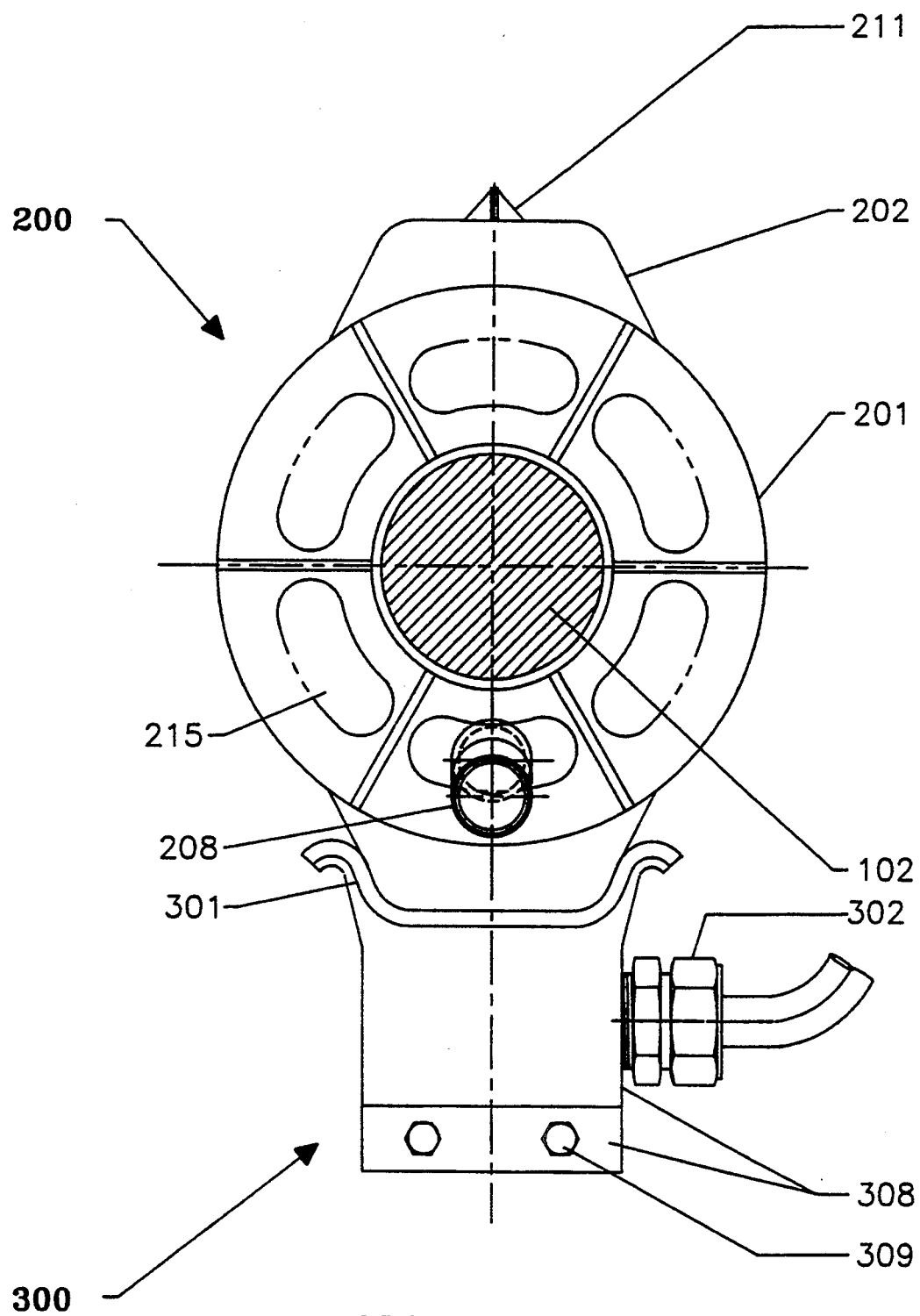
FIG. 2 is a back elevation of said rotatable double-ended quick connect valve of FIG. 1 taken at line AA, fitted in place at one end with one mating single-ended quick connect valve for mounting in a fixed position on one of the transporting rotors and an example of a hose connection leading to the vacuum source on said rotor.

FIG. 2 is an external view of said double-ended quick connect valve 200 and single-ended quick connect valve 300 at line AA of FIG. 1, showing said shaft 102 and said back plate 201 which can rotate together in relation to said valve body 202 and its connection with said valve 300. Also shown in phantom are the openings 215 in said valve body 202, and their relation to said pipe connection 208 on said back plate 201, as it rotates about said valve body 202. Also shown is the contact bar 211 at one end of said valve body 202.

Figure 3:
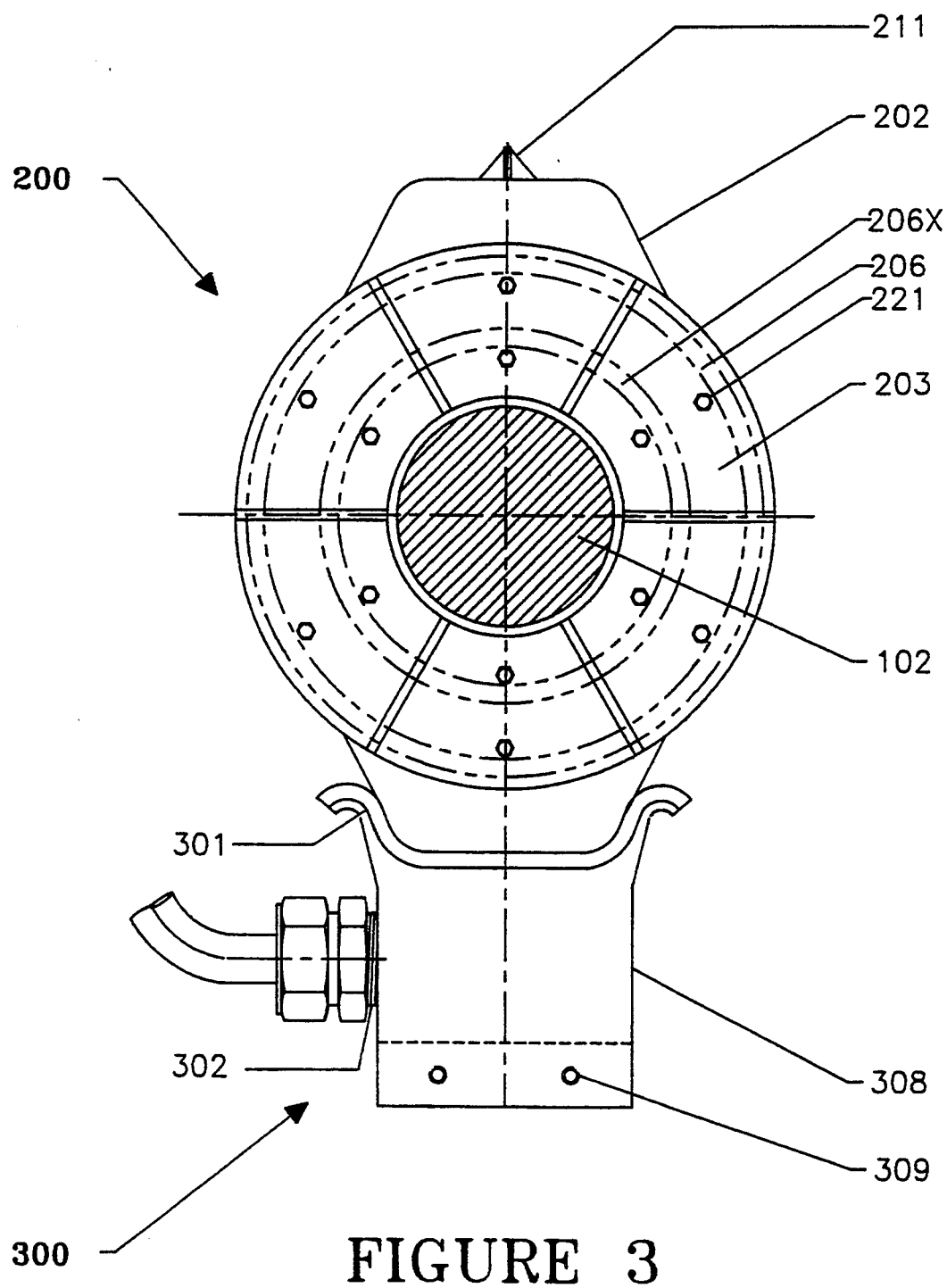
FIG. 3 is a front elevation of said rotatable double-ended quick connect valve of FIG. 1 at line CC, and said mating single-ended quick connect valve.

FIG. 3 is an external view of said double-ended quick connect valve 200 and said single-ended quick connect valve 300 at line CC of FIG. 1 with its related hose connection 307 and fixing screw 309. Also shown are contact bar 211 of the quick connect valve at one end of valve body 202, the front plate 203, shaft 102, guide pins 221 and, in phantom, ball bearings 206 and 206X.

Figure 4:
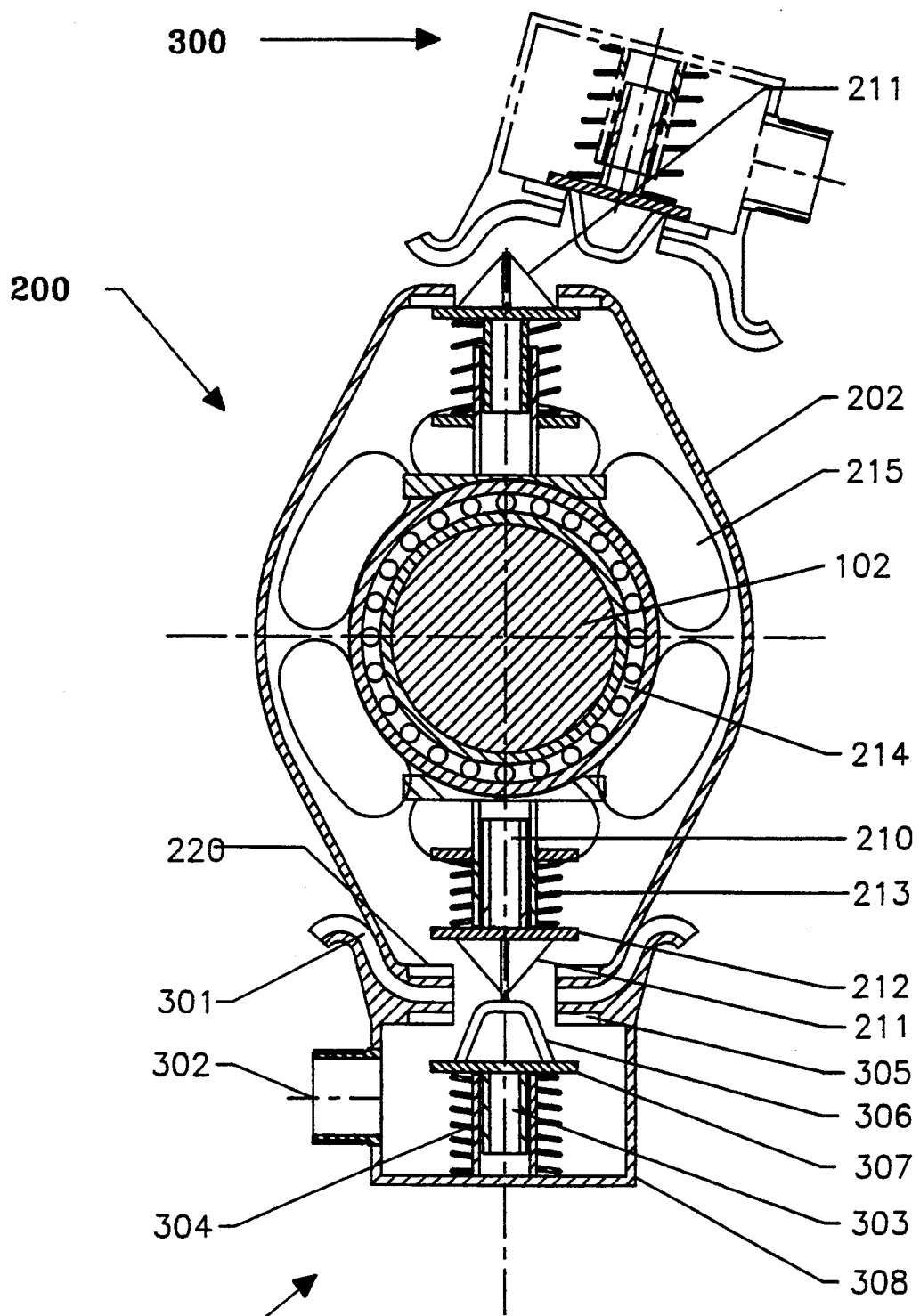
FIG. 4 is a cross section taken at line DD of FIG. 2 of said rotatable double-ended quick connect valve and said mating single-ended quick connect valve of FIG. 1.

FIG. 4 is a section through said double-ended quick connect valve 200 and said single-ended quick connect valve 300 at line DD of FIG. 2, and showing a portion of said supporting shaft 102, and the needle bearing 214 about which said valve body 202 rotates on said shaft 102. Also shown are the back plate 201, the rubbing gasket 203, the ball bearings 206 and 206X, the front plate 203, the pressure springs 207, the guide pins 221, and the pressure plate 204. In the interior of said double-ended valve 200 are the two spring loaded valve functions 219, each comprised of a contact bar 211, a closure plate 212, a sealing gasket 220, a pressure spring 213, and a valve guide system 210. Also shown is the single-ended valve body 308, the compression gasket 301, and the related spring-loaded valve parts comprising the sealing gasket 305, a contact bar 306, a closure plate 307, a pressure spring 304, and a valve guide system 303.

In operation, as one end of said double-ended valve 200 closes against said single-ended valve 300, said related contact bars 211 and 306 press against each other, depressing said springs 213 and 304, thus opening both of said valves 200 and 300 by moving said closure plates 212 and 307 away from their respective closure gaskets 220 and 305. At the same time, said valve bodies 202 and 308 are sealed together by compressing said gasket 301 between them, thus completing the flow connection between said valves 200 and 300.

In a typical operation, the shaft 102, together with said back plate 201 and also said front plate 203, together with said springs 207, said guide pins 221, and said pressure plate 204, will be required to rotate around on said rubbing gasket 205 and said ball bearings 206 in relation to said valve 200 and its connection with said valve 300.

Figure 5:
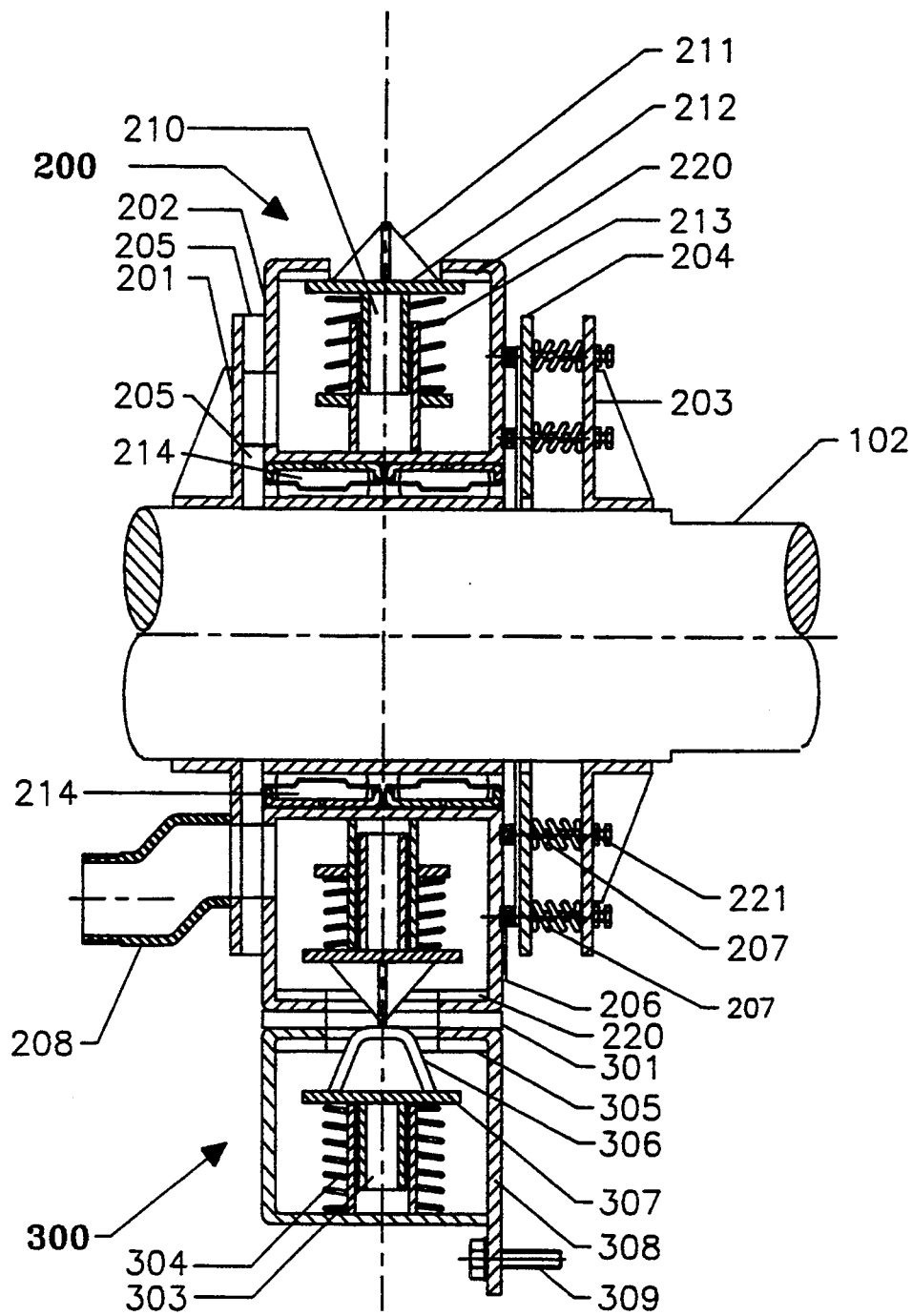
FIG. 5 is a cross section of said rotatable double-ended quick connect valve and said one mating single-ended quick connect valve of FIG. 1 taken at line BB, together with a second one of said single-ended quick connect valves shown approaching its intended new position at the second valve end of said double-ended quick connect valve.

FIG. 5 is a cross section through said valve 200 and said shaft 102 at line BB of FIG. 1, and also through two valves 300, showing a full connection between one of said valves 300 with said valve 200 at one end, and with a second valve 300 approaching said valve 200 at the other end. Shown internally of the valve 200 are the shaft 102 and the needle bearing 214, also the openings 215 in the valve body 202 and the rubbing gasket 205, which cooperate with the pipe connection 208 on back plate 201 as said shaft 102 together with said back plate 201 rotate about said valve body 202. Also shown are the elements of the two valve functions 219 of valve 200, each comprised of a contact bar 211, a closure plate 212, a pressure spring 213, and a valve guide 210. In each of the valves 300 is shown the valve elements of which it is comprised, including a closure gasket 305, a contact bar 306, a closure plate 307, a valve guide 303, and a pressure spring 304.

Figure 6:
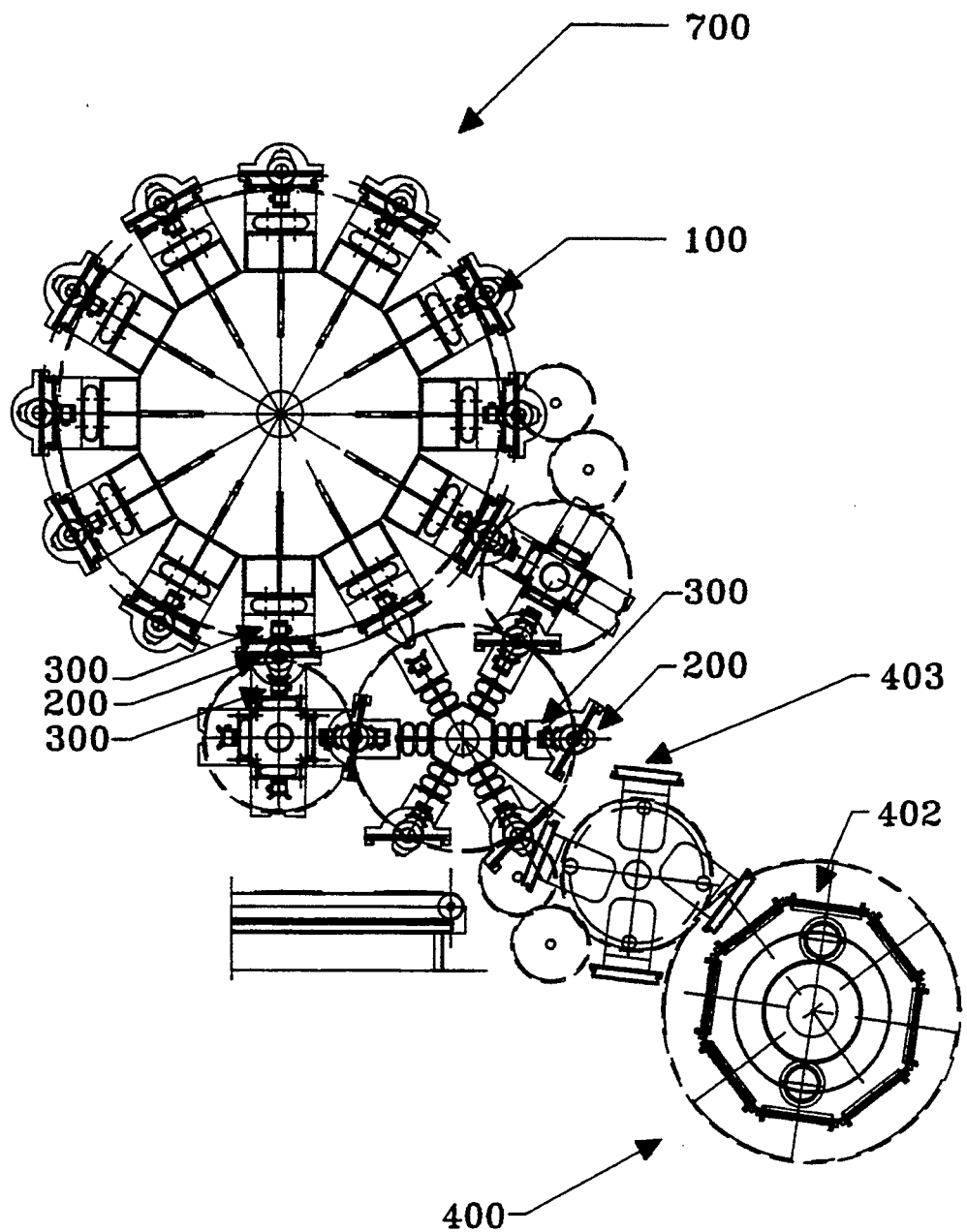
FIG. 6 is a side elevation of one example of a moulding machine assembly on which said double-ended quick connect valves 200 and their mating single-ended quick connect valves 300 are to be installed.

FIG. 6 is a diagrammatic elevation of a pulp moulding and drying machine 1000, on which the wet preforms are transported from the forming dies 401 on rotor 400 by the fixed transfer dies 403 on rotor 402 to the vented transfer and pressing dies 404 mounted on the transferable shaft assemblies 100 on rotor 500, from whence said dies 404 and said shaft assemblies 100 are transferred to support positions on rotor 600 and thence to mating positions with heated pressing dies 405 on rotor 700. The wet preforms are hot pressed and dried while travelling about on said hot pressed and dried, are transferred to rotor 800 and thence transferred to rotor 500, where said pressed and dried preforms are discharged at location 501, and said transfer and said pressing dies 404, now empty, are carried about on rotor 500, to mate once more with said first transfer dies 403 on rotor 400, where they will receive another lot of wet preforms, and repeat the entire cycle, all in continuous motion. In order to maintain in place on said vented transfer and pressing dies 404 said wet preforms while they are transported from said first transfer dies 402 to the mating position with said heated pressing dies 405, and said dried preforms, as they are transported, still on dies 404, from the mating position on said heated pressing dies 405, around on rotors 800 and 500 to the discharge point 501, it is necessary to maintain a constant supply of vacuum to said transfer and pressing dies 404, as they travel about on rotors 500, 600 and 800. Shown on the diagram of FIG. 6 are the locations of double-ended valves 200 mounted on each of the shaft assemblies 100, and the single-ended valves 300 mounted on each of the support positions for said shaft assemblies 1 00 on each of the rotors 500, 600, 700 and 800. On rotors 500, 600 and 800 the vacuum supply is required to hold the product in place on the dies, and on rotor 700 the vacuum supply is required to remove the water and vapour expressed and evaporated from the wet product through the vented transfer and pressing dies 404.

What I claim is:

1. A rotatable double-ended quick connect valve comprised of a main valve body mounted on a shaft between a back plate and a spring-mounted pressure plate, said back plate and said pressure plate being mounted in fixed positions on said shaft, and said valve body being rotatably mounted and pressed between them, said valve body being fitted with two quick connect valves, one at each end of said valve body, said back plate being fitted with a pipe connection outlet, the interior of said valve body forming a circumferential flow chamber surrounding said shaft between said two quick connect valves, and the back of said flow chamber having an exterior gasket rubbing against said back plate, and a series of closely spaced openings around its entire circumference and through said gasket to provide a continuous flow connection with said pipe connection outlet on said fixed back plate as said valve body rotates about said shaft in relation to the fixed position of said outlet on said back plate on said shaft.

2. A series of quick valve connections operated by said rotatable double-ended quick connect valve of claim 1 cooperating with a multiplicity of single ended quick connect valves, said single ended valves being arranged for connection and disconnection one after another, consecutively and in series, connecting first with a first single-ended quick connect valve, thus opening both mating valves, and allowing a flow through both, and then the quick connect valve at the other end of said rotatable valve body cooperating with the next single-ended quick connect valve in the series and so on, said first one of said single-ended quick connect valves remaining in full connection with the valve at one end of said rotatable valve body until said next single-ended quick connect valve is also in full connection with the valve at the other end of said rotatable valve body, following which said first single-ended quick connect valve is removed from connection with said double-ended quick connect valve, this series of connections proceeding in turn and in the same manner with a third and fourth and so on of the single ended valves thus providing a continuous supply of vacuum or compressed air as required from the source through said single-ended valves and said double-ended valve to the point of supply.

3. The rotatable double-ended quick connect valve of claim 1 having a rotary bearing between said rotatable valve body and said shaft on which it is mounted.

4. The rotatable double-ended quick connect valve of claim 1 having a rotary needle bearing between said rotatable valve body and said shaft on which it is mounted.

5. A single-ended quick connect valve for use in fixed position to cooperate with the rotatable double-ended quick connect valve of claim 1, said single-ended quick connect valve having a gasketed receiving face of a shape to receive and partly enclose one end of the rotatable valve body of said rotatable double-ended quick connect valve of claim 1, and thus to retain said valve body in fixed orientation while said back plate and said pressure plate of said rotatable double-ended valve, and the shaft on which they are both fixed in position, rotate together in relation to the closed position together of said rotatable valve body with the receiving face of said single ended quick connect valve, thus retaining said rotatable valve body in correct position to be received at its other end by the next following single-ended quick connect valve.

* * * * *

UNITED STATES PATENT AND TRADEMARK OFFICE
CERTIFICATE OF CORRECTION

PATENT NO. : 5,386,850
DATED : February 7, 1995
INVENTOR(S) : Roy William EMERY

It is certified that error appears in the above-identified patent and that said Letters Patent is hereby corrected as shown below:

Column 5, line 4, delete "mariner" and insert --manner--.

Signed and Sealed this

Twentieth Day of June, 1995

Attest:

BRUCE LEHMAN

*Attesting Officer*  *Commissioner of Patents and Trademarks*